United States Patent [19]
Geist et al.

[11] 3,814,397
[45] June 4, 1974

[54] CONTACTING COLUMN

[75] Inventors: Jacob M. Geist, Allentown; Roy A. Paul, Bethlehem, both of Pa.; Robert M. Thorogood, West Horsley, England

[73] Assignee: Air Products and Chemicals, Inc., Allentown, Pa.

[22] Filed: Dec. 21, 1970

[21] Appl. No.: 100,529

Related U.S. Application Data

[60] Division of Ser. No. 829,469, June 2, 1969, Pat. No. 3,590,475, which is a continuation of Ser. No. 585,796, Oct. 11, 1966, abandoned.

[52] U.S. Cl. ................. 261/114 R, 55/233, 62/482, 202/158
[51] Int. Cl. ............................................. B01d 3/16
[58] Field of Search ...... 261/148, 113, 114, 114 JP; 202/153, 158; 23/285, 288 R, 289; 29/282, 283, 471.1, 482; 138/44; 55/233; 62/482

[56] References Cited
UNITED STATES PATENTS

| | | | |
|---|---|---|---|
| 1,630,037 | 5/1927 | Stresau | 220/5 |
| 1,655,931 | 1/1928 | Langstroth | 196/133 X |
| 1,915,746 | 6/1933 | Moore | 261/114 |
| 2,201,949 | 5/1940 | Wentworth | 261/114 |
| 2,310,829 | 2/1943 | Becker | 261/113 |
| 2,483,178 | 9/1949 | Boninger | 23/288 R |
| 2,659,966 | 11/1953 | Tunnbull | 29/482 |
| 2,807,451 | 9/1957 | Kuhni | 261/114 R |
| 3,026,910 | 3/1962 | Cawker et al. | 138/44 |
| 3,162,700 | 12/1962 | Irons | 261/114 |
| 3,235,344 | 2/1966 | Dreyer et al. | 23/289 |
| 3,430,932 | 3/1969 | Kuechler | 261/114 R |

FOREIGN PATENTS OR APPLICATIONS

| | | | |
|---|---|---|---|
| 660,379 | 4/1963 | Canada | 261/114 R |
| 655,087 | 1/1938 | Germany | 261/114 |
| 834,651 | 5/1960 | Great Britain | 261/114 R |
| 964,441 | 7/1964 | Great Britain | |

*Primary Examiner*—Frank W. Lutter
*Assistant Examiner*—Vincent Gifford
*Attorney, Agent, or Firm*—Ronald B. Sherer; Barry Moyerman

[57] ABSTRACT

Disclosed is a small diameter contact column having a vertical series of contact chambers separated by perforate plates. Fully erected columns of this type are substantially inaccessible for subsequent placement and attachment of internal parts. The column is achieved by superimposing a plurality of interengaging cylindrical sections adapted along their outermost engaging edges to be rigidly joined and along their innermost engaging edges to receive and support a perforate plate. The perforate plate support means permits free relative movement of the plate due to temperature change and at the same time prevents liquid from passing between the column wall and the peripheral edge of the perforate plate.

2 Claims, 3 Drawing Figures

CONTACTING COLUMN

CROSS REFERENCES TO RELATED APPLICATIONS

This application is a divisional application of our co-pending application Ser. No. 829,469 filed June 2, 1969 now U.S. Pat. No. 3,590,475 which application was a continuation of our co-pending application Ser. No. 585,796, filed Oct. 11, 1966 and now abandoned.

BACKGROUND OF THE INVENTION

Contact columns having contact plates or trays can be used to separate the components of a liquid mixture to scrub gases or vapors with liquids for fractionation of liquefied gases such as rectification of liquid air.

Contact columns of narrow diameter, particularly those columns used in rectification of cryogenic fluids pose special design problems in obtaining operational efficiency. In wider columns of 36 or more inches having sufficient operating space for workmen inside thereof, a complete outer shell can be utilized and the inner parts, such as trays and the like, can be later fitted and sealed within the shell. These procedures cannot be utilized in connection with columns of smaller diameter, e.g. on the order of about 18 to 24 inches. In forming contact columns of small diameter, the conventional practice is to use thin copper trays of dish or bowl-like shape which are stacked one above the other in nesting relation and sealed by soldering at the peripheral edges of the dishes. The assembled and united stack of trays is mounted within an enclosing shell and the assembled structure is then fitted and fixed into an outer enclosing secondary shell or pressure-proof vessel. Since the connecting conduit lines for introduction and removal of fluids into and from the column are generally made of metals other than copper, transition pieces and special flanges are required at the joints between the different metals. The soldered joints between trays and elsewhere also provide problems in maintaining firm fluid seals. Construction of this type, it will be appreciated, is comparatively costly. Substitution of aluminum for the copper dish trays in structures of this type is not feasible because of the inherent difficulties in soldering aluminum; whereas, welding presents added problems from the standpoint of buckling due to the high temperatures required.

SUMMARY OF THE INVENTION

It has been found that narrow contact columns can be constructed of a light metal such as aluminum or magnesium by providing a series of vertical interengaging chambers (rings) with perforate plates disposed between each chamber. The vertical chambers are so constructed that they can be circumferentially welded without distortion of the shell or the perforate plate. The plates are disposed in a recess provided by a shelf in the wall of one ring and closed by the mating of adjacent chambers (rings) in a manner so as to be able to freely expand and contract in service and at the same time maintain a fluid seal between the peripheral edge of the plate and the wall of the column.

The primary object of the present invention is to provide a small diameter column made of a light metal of high efficiency and good structural stability which can be economically produced.

A further object of the invention is to provide a method of assembly of such contact columns by welding of component parts without distortions ordinarily accompanying thermal stresses.

Another object of this invention is to provide a contact column wherein the trays are so supported that they can move laterally in response to thermal contraction and expansion and thus prevent buckling of the trays and column while, at the same time, maintaining a sufficiently small clearance between the trays and column walls so as to prevent liquid bypass when the column is in service.

It is another object of this invention to provide a contact column constructed entirely of aluminum, magnesium, or other light metals.

It is another object of this invention to provide contact columns of sufficient integral strength so as to eliminate the need for secondary shells.

It is still a further object of this invention to provide an assembly procedure wherein all assembly operations can be performed without the necessity of a workman entering the column.

DESCRIPTION OF THE PREFERRED EMBODIMENT

Figure 1:
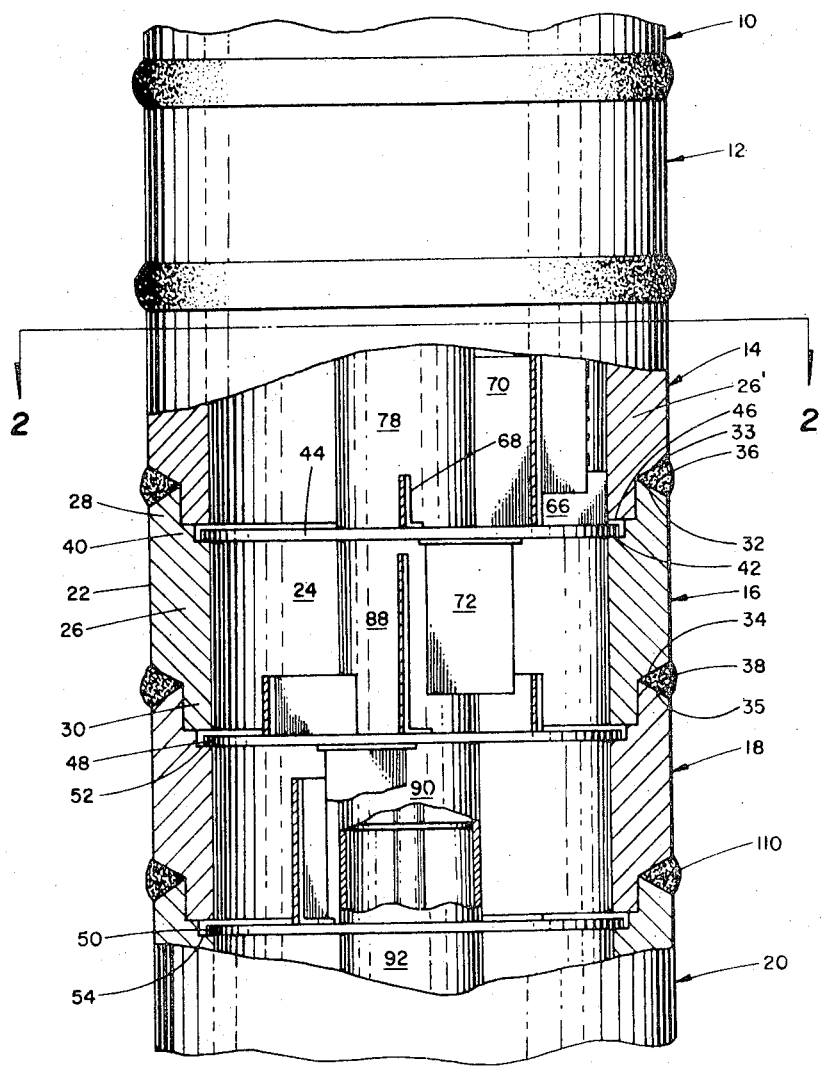
FIG. 1 is an elevation view, partially in section of a fragmentary portion of a contact column embodying the preferred form of the nested ring construction.

Referring to FIG. 1 there is shown a contact column of about 24 inches inside diameter comprising a plurality of chambers or rings 10, 12, 14, 16, 18, and 20. Each ring is identical in size and formed of a light metal such as aluminum or magnesium although other materials of construction may be employed. Each ring is preferably cylindrical in shape with an outer surface 22 and an inner surface 24 defining a wall 26 therebetween as shown in conjunction with ring 16 of FIG. 1.

A portion of surface 24 is removed from the top and a portion of surface 22 is removed from the bottom of each ring to provide reduced wall sections 28 and 30 respectively. The reduced wall portions 28 and 30 are the same configuration for each ring so that a plurality of rings can be assembled in a stacked relationship with a resulting uniform inside and outside diameters for the assembled column. The type of joint resulting from the reduced wall portions of adjacent rings is commonly referred to as a lap joint. Reduced wall portions 28 and 30 are further provided with chamfered surfaces 32, 34 to define a groove between adjacent rings (e.g. 14 and 18 respectively). Adjacent rings 14 and 18 are also provided with similar chamfered surfaces 33, 35 respectively so that a V-groove is achieved between adjacent rings. The V-groove can then be used to circumferentially join adjacent rings as by placing therein welds 36, 38 respectively. Other joining means can be employed depending upon the operating environment of the column; however, for a column constructed of aluminum for cryogenic fluids, conventional aluminum metal girth welds are preferred.

There is also formed on surface 24 a second portion of reduced wall thickness 40 which defines a shelf 42 for supporting tray 44 as will hereinafter be more fully described. The reduced wall section 40 is intermediate in thickness between reduced wall section 28 and wall 26. Shelf 42 and the bottom surface 46 of wall 26' of ring 14 thus form a peripheral recess for positioning of the tray 44 in the column. Reduced wall section 40 is formed with an axial length just sufficient to allow expansion of the tray from heat generated by circumferential weld 36 being put in place. It is also sized so that if the column is used with cryogenic fluids the space between the tray 44 and reduced wall section 40 will not be large enough to pass fluid to the chamber defined by surface 24 of ring 16.

The rings are conveniently formed from aluminum plates cut to appropriate lengths which are rolled into cylindrical sections and welded along their length. The configurations of the reduced wall sections 28, 30, 40, including the shelf 42, may be formed during forming of the rings or may be conveniently machined into the formed and welded rings. The rings with reduced wall sections can also be formed by other conventional metal-working techniques such as casting, forging, extruding, etc., in conjunction with machining.

Perforate circular trays 44, 48, and 50 also preferably formed of aluminum, are adapted to be received and supported on shelves 42, 52, and 54 of rings 16, 18, and 20 respectively, within annular recesses formed as described above between the respective adjacent rings. In the embodiment described, the radial dimension of each tray is about 0.12 inches less than the radial dimensions of reduced wall section 40 formed in wall 26 of ring 16. This dimensional difference between a tray and its respective reduced wall section allows for different size changes in the column proper and trays during welding or in use, while at the same time preventing buckling of the trays. The vertical height of each recess after welding is about 0.01 inches greater than the thickness of the trays which is about one-sixteenth of an inch. The gap formed between the top of the trays and the bottom of the wall of the adjacent ring is so small that liquid will not flow therethrough. The gap between the top of tray 44 and surface 46 can be accurately measured after the rings 14 and 16 have been joined by the weldment 36.

Figure 2:
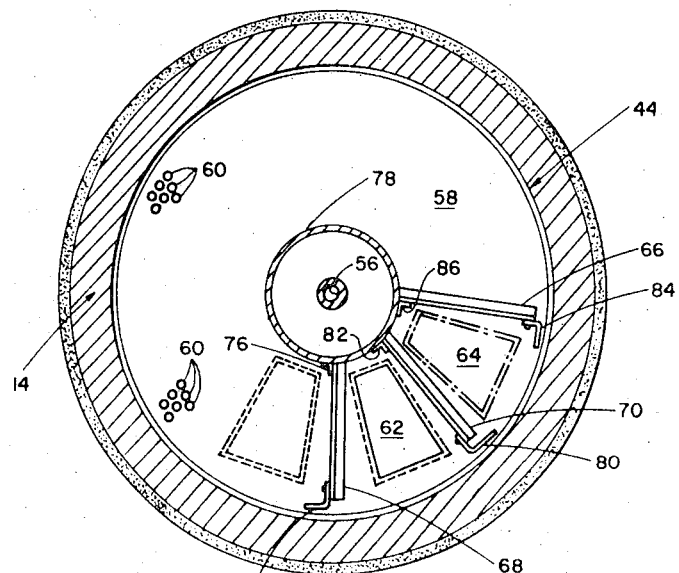
FIG. 2 is a section taken along lines 2—2 of FIG. 1 showing the construction of a typical contact tray and illustrating the relative positions of its downcomer opening, weir and baffles.

Referring to FIGS. 1 and 2, it can be seen that typical tray 44 includes a central opening 56, a major surface 58 having perforations 60 therein, a downcomer opening 62 and a non-perforate annular sector 64. The downcomer position thereabove is shown in phantom lines to the right of opening 62 of tray 44 (FIG. 2) while the downcomer opening in the tray 48 therebelow is shown in dotted outlines to the left of opening 62. The perforate region 58 occupies the major portion of tray 44 and extends from a low inlet weir 66 counterclockwise to an outlet weir 68 of the same height. The downcomer opening 62 is positioned angularly between outlet weir 68 and a substantially higher baffle 70. The non-perforate sector 64 is located angularly between the high baffle 70 and the low inlet weir 66. As can be seen in FIG. 1, the outlet weir 68, baffle 70 and the inlet weir 66 are all positioned on the upper surface of tray 44. A downcomer conduit 72 is located on the underside of tray 44 and circumscribes the downcomer opening 62. The elements 66, 68, 70, and 72 are fixedly secured to and supported on the tray 44 in any convenient manner such as by riveting or welding.

Flexible tab 74 of substantially the same height as weir 68, is secured along its outer edge to the weir 68. The tab forms a fluid tight joint with the weir. The outer edge of tab 74 abuts the inner wall of ring 14 of the column in fluid-sealing relationship therewith. If desired, the other edge of weir 68 may also be provided with a rigid or flexible tab 76 adjacent pillar 78, which will be described in detail hereinafter. Tabs 80 and 82, at least one of which is flexible, of the same length as the tall baffle 70 and one or more tabs 84 and 86, at least one of which is flexible, of the same length as the low inlet weir 66 are also provided. Tab 80 forms a flexible fluid tight joint between baffle 70 and inner wall of ring 14 and tab 82 forms a fluid tight joint between baffle 70 and pillar 78. Tab 84 forms a flexible fluid tight joint between weir 66 and the inner wall of ring 14 and tab 86 forms a fluid tight joint between weir 68 and pillar 78. The tabs 74, 80, and 84 which form fluid tight joints between the respective baffle and weirs and the inner wall of ring 14 permit relative radial movement between tray 44 which supports baffle 70, and weirs 66 and 68 and the column proper. The tabs can be formed of any material that will remain flexible under operating conditions. For cryogenic applications, thin metal (e.g. aluminum) tabs are satisfactory.

Figure 3:
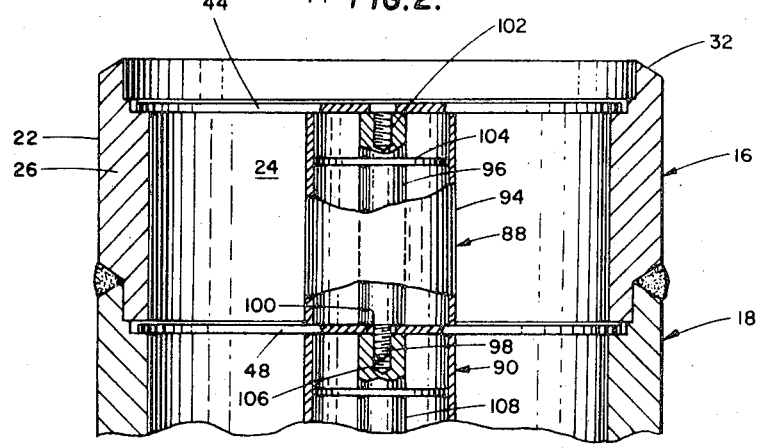
FIG. 3 is an enlarged view partly fragmentary and partly in section of a full ring and a portion of an adjacent ring illustrating details of the method for fastening adjacent pillar sections.

In addition to the rings and trays, the contact column includes central cylindrical pillar sections 78, 88, 90, and 92. Referring now to FIG. 3 it can be seen that each pillar section is formed with a collar 94 and an inner shaft 96 having a threaded extension 98 at one end adapted to extend through the opening 100 of tray 48. A complementary threaded recess 102 is provided at the other end of shaft 96. Each shaft is connected to its respective collar by an annular plate 104. The dimensions of the collars and shafts are so related to the dimensions of the rings and trays that the adjacent shafts, when interthreaded, will cause their respective collars to tightly clamp the trays with which they are assembled. For example, tray 48 is tightly clamped by collars 88 and 90 when the threaded extension 98 of shaft 96 is inserted in the threaded aperture 106 of shaft 108 of pillar 90.

While the liquid vapor contact trays of the type illustrated in FIGS. 1 and 2 are preferred, it will be understood that the essential features of the invention can be utilized with columns having vapor-liquid contact trays other than of the sieve or perforated bottom type, such as trays provided with bubble caps, valved openings, or other types known in the art. Moreover, with any type of tray employed, the central pillar can be omitted and the whole surface of the tray utilized for vapor-liquid contact, with or without localized liquid downcomer or withdrawal openings.

In addition to the ring, tray, and pillar units described above, the contact column includes a conventional top closure and bottom closure (not shown) fitted with the usual conduits for entry and removal of fluid.

The operation of the contact column when employed for example, in the rectification of liquid air is as follows: Vapors from above the liquid on a first liquid-vapor contact tray move upwardly through the perforations of the tray above and bubble into the liquid contained thereon. The liquid on the first tray received from the downcomer of the tray above travels (counterclockwise in the illustrated embodiment) along an annular passageway on the tray around the pillar. In its travel, the liquid receives vapors from below through the perforations of the first tray and loses vapors to the space thereabove. The liquid on the first tray flows over the weir through the downcomer opening of the first and onto the imperforate sector of the tray below. Each lower tray is oriented with respect to the tray above so that the non-perforate annular region thereof is directly beneath the downcomer of the tray immediately thereabove. The liquid seal between the trays and recesses in the column proper provided by their relative dimensions eliminates, for all practical purposes, leakage of liquid down the inner wall of the column. Such seal is effected by reason of the surface tension of the liquid and the pressure differential across the narrow gap between the top of the tray at its peripheral edge and the recess in which it rests.

A preferred method for assembly of the column will now be described with reference to the specific embodiment illustrated in the drawings. This type of column can be readily assembled employing a lathe type setup utilizing a welding positioner and retractable support rollers movable along the lathe bed between the lathe head and tail stock.

A first ring, for example ring 20 shown in FIG. 1, having a pillar section 92 arranged concentrically therein is positioned in a chuck on the lathe head with its lower end (as seen in FIG. 1) held by the chuck. The first tray 50 is then placed on shelf 54 and over the top of pillar section 92, care being taken to assure proper orientation of the tray. The threaded extension (not shown) of pillar section 90 is then inserted through the central opening of tray 50 and is screwed into the female threaded recess of the shaft (not shown) within pillar section 92 thus tightly clamping tray 50 between the opposed edges of the collars of pillar sections 90 and 92. Pillar sections 90 and 92 now hold tray 50 with its downcomer in correctly oriented position. The second ring 18 is now inserted into the exposed end of ring 20 with the reduced wall section at the bottom of ring 18 nested within the reduced wall section at the top of ring 20 forming a lap or rabetted joint.

The tail stock of the lathe is advanced to initially engage the distal end of the second ring (18), after making sure that the bottom of ring 18 is properly mated with the top of ring 20. The tail stock is then advanced further to exert firm pressure between the seated rings. Now the rings are welded in their nested relation by applying a girth weld as shown at 110 within the V-groove formed by chamfering the adjacent outermost surfaces of adjacent rings. Such welding can be accomplished in a conventional manner using a torch mounted in fixed position on a translatable carriage, while rotating the sections held between the lathe stocks.

After welding together the first two cylindrical sections having the first tray therebetween, the assembled portion of the column is laterally supported by retractable rolls and the tail stock backed off to provide access within the second ring and permit installation of the weir and baffle end tabs. These are riveted, bolted, or otherwise fixed in place similarly as shown in FIG. 2 for tabs 74, 80, 84, 76, 82, and 86. Thereafter tray 48, with weirs, baffle, and downrun conduit attached thereto, is positioned on the exposed surface of shelf 52. Pillar 88 is next threadily connected to pillar 90 as described for the connection of pillar sections 90 and 92. The downcomer opening in tray 48 is aligned with the non-perforate annular region of tray 54 as tray 48 is clamped and held in position by pillar 88. Ring 16 is then fitted into ring 18. The tail stock is advanced to press ring 16 against ring 18 and the weld 38 is made. Thereafter the tail stock is backed off and the tabs are installed and secured by bolts or rivets.

Other trays, pillars, and rings are added to the assembly as were ring 16, tray 48, and pillar 88. Thereafter the assembled rings may be removed from the lathe and the top closure and bottom closure welded or otherwise attached to the ends thereof.

During initial assembly, the height of the reduced wall section (e.g. 40 of FIG. 1) defining the tray supporting recess of the column is somewhat greater than that required, so that the gap between the top of a tray and the overhanging bottom of the next adjoining ring is larger than the desired tolerance. During welding of the ring sections, the rings are drawn together more tightly, thus shrinking the distance between ring and tray thereby providing the desired tolerance permitting lateral movement of the edge of the tray while maintaining the desired liquid seal between the periphery of the tray and its supporting recess.

Having thus described our invention by what is considered to be the preferred embodiment, we wish it understood that it is to be limited only by the scope of the appended claims.

We claim:

1. An elongate upright contact column of less than thirty-six inches inside diameter having contact plates or trays normally used to separate the components of a liquid mixture to scrub gases or vapors with liquids and for fractionation of liquefied gases including rectification of liquid air comprising in combination:

a plurality of cylindrical rings assembled in a stacked relationship thereby defining a column, each of said rings having a first end abutting the ring immediately above and a second end abutting the ring immediately below; the first end of each ring having a first annular reduced wall portion enlarging the inside diameter of the ring and a second annular reduced wall portion enlarging the inside diameter of the ring and adjacent the first annular reduced wall portion and of smaller diameter than said first annular reduced wall portion; the second end of each ring having an annular reduced wall portion decreasing the outside diameter of the ring so that when the rings are stacked, the annular reduced wall portion of the second end of each ring can be inserted into the first annular reduced wall portion of the ring below resulting in a lap joint of the rings with the second annular reduced wall portion of the ring below and the ring about defining a circumferential groove on the inner wall of said rings;

an outer wall circumferential groove defined by the outer opposed ends of the lap joints being chamfered outwardly with a girth weld deposited in said outer wall circumferential groove;

circular trays supported at their peripheral edges within said annular grooves on the inner wall of said column; the inner wall grooves being sized and the trays being of a diameter and thickness so that the relative size changes that take place in the column and trays during assembly and use prevent buckling of the trays by allowing free axial and radial expansion and contraction of said trays thereby preventing fluid from flowing between the tray and the groove as the column is operated;

disposed within said column along the axis thereof a plurality of cylindrical pillar sections between adjacent trays and assembled in end to end relation with each pillar assembly having mated screw connections at either end which screw connections extend through a central aperture in the tray to be held therebetween;

the circular trays having a major arcuate section containing perforations for allowing upflow of gaseous material from the space below in the column, a non-perforate arcuate section and an adjacent arcuate section having a downcomer opening, with an inlet weir between said non-perforate and perforate arcuate sections, an outlet weir between said perforate and downcomer arcuate sections and a baffle between said downcomer and non-perforate arcuate sections, the trays assembled so that the downcomer opening of the tray above is over the non-perforate arcuate section of the tray below, so that liquid from the tray above can collect in a shallow pool in the non-perforate arcuate section of the tray below, flow over the inlet weir around the perforate section of the tray for contact by using gaseous material over the outlet weir down the downcomer to the tray below, the baffle preventing fluid from returning to the non-perforate section of the same tray.

2. A contact column according to claim 1, in which the weirs and the baffle are plates extending across the annular space between each of the pillar sections and the inner wall of the column, with their lower edges in substantially fluid-tight contact with the surface of the tray, and including connecting means for joining both the inner vertical edge of the plates to the pillar and the outer vertical edge thereof to the wall of the ring in fluid-tight connection, at least one of said connecting means being resilient.

* * * * *